United States Patent [19]
Diel et al.

[11] Patent Number: 5,606,702
[45] Date of Patent: Feb. 25, 1997

[54] METHOD FOR SPECIFYING USER INTERFACES AND PROGRAMMING SYSTEM RUNNING A MULTIPLE USER INTERFACE COMPUTER

[75] Inventors: Hans H. Diel; Hans G. Dockweiler, both of Sindelfingen; Martin Welsch, Herrenberg, all of Germany

[73] Assignee: International Business Machines Corporation, Armonk, N.Y.

[21] Appl. No.: 560,947

[22] Filed: Nov. 20, 1995

Related U.S. Application Data

[63] Continuation of Ser. No. 122,551, filed as PCT/EP91/01642 Sep. 29, 1991 published as WO92/17838 Aug. 15, 1992, abandoned.

[51] Int. Cl.$^6$ ........................................................ G06F 9/45
[52] U.S. Cl. ...................... 395/682; 395/118; 364/280.4; 364/286; 364/977; 364/976.5
[58] Field of Search .............................................. 395/700

[56] References Cited

U.S. PATENT DOCUMENTS

| | | | |
|---|---|---|---|
| 4,689,761 | 8/1987 | Yurchenco | 364/708 |
| 5,119,479 | 6/1992 | Arai et al. | 395/275 |
| 5,157,384 | 10/1992 | Greanias et al. | 340/706 |
| 5,200,888 | 4/1993 | Hashimoto | 364/400 |
| 5,327,529 | 7/1994 | Fults et al. | 395/155 |

OTHER PUBLICATIONS

Kleyn, M. F. & Chakravarty, I., "EDGE—A Graph Based Tool for Specifying Information," Communications of the ACM, 1988, 1–14.

Wu, Peter Y. F., "User Interface Management Systems: Survey and Assessment," Research Report of the IBM Research Division, Jun. 1989, 1–18.

Morin et al, Vitamin Toolkit: A Uims for CIM Applications, Languages for Automation, 1988 Workshop, pp. 80–89.

Hodges et al, Construction Set for Multimedia Applications, IEEE Software, Jan. 1989, pp. 37–43.

Koivunen et al, Hutwindows: An Improved Architecture for a User Interface IEEE Computer Graphics and App. Magazine, Jan. 1988, pp. 43–52.

Manuel E. Bermudez, A Unifying Model for Look Ahead LR Parsing, Computer Languages, 1988 International Conference, pp. 18–24.

Weicha et al, "TTS: A Tool for Rapidly Developing Interactive Applications" ACM Transactions on Information Systems, V8 No. 3 Jul. 1990 pp. 204–236.

Kanorowitz et al, "The Adaptable user Interface", Communications of the Association for Computing Machinery, v. 32 No. 11 Nov. 1989, pp. 1352–1358.

Laenens et al, Towards a Flexible User Interface for Knowledge Bases, Visual Languages 1990 IEEE Workshop, pp. 143–148.

Yoo et al, Debbie; A Configurable User Interface for CAD Frameworks, Computer Design–ICCD '90, pp. 135–140.

Khalifa et al, An Automated Tool for Describing and Evaluating User Interfaces, Systems Sciences, 1992 Annual Hawai Intl. Conf. pp. 731–740.

Hsu, Configuration Management in the HILDA System, Tools for AI, 1990 Intl. Workshop pp. 154–160.

*Primary Examiner*—Kevin A. Kriess
*Assistant Examiner*—Lucien Toplu
*Attorney, Agent, or Firm*—William A. Kinnaman, Jr.; Heslin & Rothenberg, P.C.

[57] ABSTRACT

In a computer system, the ability to dynamically switch between different user interface types is provided. A directed graph is composed of nodes that each contain user interface information. A first part of the user interface information is common to each of the different user interface types, while a second part of the user interface information corresponds to one of the different user interface types. A presentation front end program selects a user interface type by accessing the user interface information stored in the nodes.

12 Claims, 11 Drawing Sheets

COMMUNICATION CHOICES

SELECT ONE OF THE FOLLOWING:

1 RECEIVE MAIL
    2 MESSAGES PENDING
    3 MAIL LOG
    4 MAIL STATUS

FIG.4

PERSONNEL DATA

SPECIFY OR REVISE THE CURRENT VALUES BELOW AND PRESS ENTER.

NAME . . . . . . . . . . . . . . . . _____
STREET . . . . . . . . . . . . . . _____
CITY . . . . . . . . . . . . . . . . . _____
NATIONALITY . . . . . . . . . _____
PHONE NUMBER . . . . . . _____
DATE OF BIRTH . . . . . . . _____

FIG.5

PRINT OPTIONS

FILE NAME . . . . . . . . . . _____

SELECT ONE OF THE FOLLOWING FONT TYPES
  1 PRESTIGE ELITE
— 2 COURIER
  3 ESSAY STANDARD
  4 ITALICS

PRINTER ADDRESS . . . . . . . . _____

NUMBER OF COPIES . . . . . . . _____

DEVICE MAINTENANCE

SPECIFY ONE OF THE FOLLOWING ACTIONS

1-ADD DEVICE    2-DELETE DEVICE    3-CHANGE DEVICE
4-DISPLAY DEVICE CHARACTERISTICS

| ACTION | DEVICE ADDRESS | DEVICE TYPE | MODEL NUMBER |
|---|---|---|---|
| _ | 0010 | DISK | 3880-21 |
| _ | 0030 | DISK | 3880-21 |
| _ | 0041 | PRINTER | 3820 |
| _ | 0042 | TAPE | 3920-1 |

FIG.8

UPDATE    DISPLAY    EXIT    HELP

```
ADD DEVICE
DELETE DEVICE
CHANGE DEVICE
```

DEVICE MAINTENANCE

| ACTION | DEVICE ADDRESS | DEVICE TYPE | MODEL NUMBER |
|---|---|---|---|
| _ | 0010 | DISK | 3880-21 |
| _ | 0030 | DISK | 3880-21 |
| _ | 0041 | PRINTER | 3820 |
| _ | 0042 | TAPE | 3920-1 |

```
ADD I/O DEVICE

DEVICE NUMBER . . . . . . . . . . . . . . ____
DEVICE TYPE . . . . . . . . . . . . . . . . . ____

SELECT ONE OR MORE OF THE FOLLOWING OPTIONS

☒ TIME-OUT
☐ ERROR RECORDING
☐ MIRRORING
```

FIG.9

```
ADD I/O DEVICE

DEVICE NUMBER . . . . . . . . . . . . . . ____
DEVICE TYPE . . . . . . . . . . . . . . . . . ____

TIME-OUT . . . . . . . . . . . . . . . . . . . ____  YES OR NO
ERROR RECORDING . . . . . . . . . ____  YES OR NO
```

FIG.10

DEVICE DEFINITION

DEVICE NAME  [DEVXXX]

DEVICE CLASS

○ PRINTER
○ TAPE
● DISK

IF PRINTER SPECIFY:

☐ ALL POINT ADDRESSABLE
☐ ENDLESS PAPER
☐ COLOR

IF DISK SPECIFY:

DISK SIZE  [70MB]
ACCESS TIME  [1500]

DEVICE TYPE  [IBM3380]

☒ OFFLINE AT IPL

[ENTER]  [CANCEL]  [HELP]

FIG.12

DEVICE DEFINITION

DEVICE NAME  `DEVYYY`

DEVICE CLASS

- ○ PRINTER
- ● TAPE
- ○ DISK

IF PRINTER SPECIFY:

- ☐ ALL POINT ADDRESSABLE
- ☐ ENDLESS PAPER
- ☐ COLOR

IF DISK SPECIFY:

DISK SIZE  `        `

ACCESS TIME  `        `

DEVICE TYPE  `IBM3950`

☐ OFFLINE AT IPL

[ENTER]   [CANCEL]   [HELP]

FIG.15

METHOD FOR SPECIFYING USER INTERFACES AND PROGRAMMING SYSTEM RUNNING A MULTIPLE USER INTERFACE COMPUTER

This application is a continuation of application Ser. No. 08/122,551, filed as PCT/EP91/01642 Aug. 29, 1991 published as WO92/17838 Oct. 15, 1992, now abandoned.

TECHNICAL FIELD

The invention relates to a method for developing and specifying in a computer system a user interface in an interactive mode, as well as to a programming system for running a computer comprising multiple user interface types.

BACKGROUND OF THE INVENTION

From U.S. Pat. No. 4,845,665 a simulation of computer program external interfaces is known. This patent describes a method for developing computer program external interfaces, understood as display screens and windows, by simulating the interfaces to allow prospective users or programmers to evaluate the design of the program, even before program code for the simulated program is created. The interfaces are executed as a simulated program. During execution, the interfaces may be altered; execution can then continue using the altered interfaces.

This known method concerns a facility to define and simulate user interfaces that are concerned with visible indications for human. It does not provide support for multiple user interface types in a general way.

With advanced programming systems it will be necessary to support different types of user interfaces. Those different types of user interfaces may for example be:

a panel oriented dialog interface with data entry panels, selection panels, and list panels which can be displayed on non-programmable or programmable terminals;

a direct manipulation interface where by use of, for example, a mouse device the user can directly manipulate the graphical representation of objects on the display screen;

a speech input and/or speech output interface;

a combination of the above interactive interfaces;

a command language interface for the experienced user.

Further types of user interfaces, e. g. touch screen interfaces, are known already today, still additional ones may show up in the future.

Often, it is desired to support multiple such user interface types by a programming System, for example, an operating system. For most programming systems it is also useful to be extendable towards the support of future new user interface types.

Today there exist different implementation techniques for the various user interface types. However, the separate implementation of each of those interface types has the following disadvantages:

it results in a high development effort;

it makes it more difficult to ensure consistency among the different types of user interface implementations. With a consistent implementation of the different user interface types the same set of input parameters is requested, with the same default values, and with identical validity checking;

it makes it difficult or almost impossible to combine and integrate the multiple user interface types, such that for example dynamic switching from one user interface type to another is possible.

In the past the afore-mentioned problems and disadvantages were not taken that seriously because the number of user interface types being considered was low. Certain advanced user interface types such as the direct manipulation interface and speech I/O are still only rarely used in general purpose programming systems. Furthermore with the few user-interface types being considered it was accepted to spent additional effort to solve part of the afore-mentioned problems and disadvantages.

The best example where in existing programming systems multiple, namely two, user interface types are supported concurrently are programming systems which support a command language interface beside a panel oriented dialog interface. Such examples are known from the IBM Operating Systems VSE, MVS, and VM. With a typical implementation of such programming systems the dialog interface is implemented on top of the command interface. This reduces the above mentioned problems and disadvantages, but this solution can only be extended with difficulty to support more than two user interface types. In addition, this method imposes restrictions on the flexibility of the superimposed interactive user interfaces. For example, all input parameters must be completely input by the user, before the underlying command interface may even be called.

SUMMARY OF THE INVENTION

It is therefore the object of the present invention to provide a method and a concept of the realization of a human-computer-interface so that multiple different user interface types can be supported concurrently in a consistent manner. It is also an object to provide a programming system that is able to run a computer system comprising multiple user interface types.

These as well as other objects are solved basically by applying the features laid down in independent.

Further advantageous developments are laid down in the respective depending sub-claims. The specific features and advantages are either self-explaining or will be explained in connection with the following-more detailed description.

The present invention has the following advantages:

1) It guarantees the consistent support of multiple user interface types since such information which is common for multiple user interface types either exists only once, namely in the general part of the user interface information (GP-UII), or is generated out of the GP-UII by use of development tools which ensure consistency.

2) It enables the implementation of integrated facilities, such as the ability to switch dynamically between different user interface types. Such facilities are only feasible, if a) there exists a common control information which remains valid, even if for example the user interface type is switched dynamically. The GP-UII represents this common information;

b) There exists a central function which is in control of the user interface and is independent of the user interface type presently active. For this purpose the generalized user interface layer (GUIL) is provided.

3) It saves development costs since with both the run-time program structure and the development tools, functions which are common among multiple user interface types, are implemented only once.

4) It makes the programming system easily extendable to new interface types since due to the application structure the functional program and the presentation front-end programs dealing with user interfaces are properly separated.

BRIEF DESCRIPTION OF THE DRAWINGS

In the following the invention will be explained in more detail in connection with the shown and described embodiment and the Figures in which

FIG. 4 shows a panel resulting from the UII (user interface information) shown in Example 1;

FIG. 5 shows a panel resulting from the UII shown in Example 2;

FIG. 6 shows a panel resulting from the UII shown in Example 3;

FIG. 7 shows a panel resulting from the UII shown in Example 4;

FIG. 8 shows a panel resulting from the UII shown in Example 6;

FIG. 9 shows a panel resulting from the UII shown in Example 7, and

FIG. 10 shows a panel resulting from the UII shown in Example 7 if there are less than three choice items.

FIG. 12 shows a panel produced using the dialog interface.

FIG. 15 shows a panel allowing the input of device attributes using the dialog interface.

DESCRIPTION OF THE PREFERRED EMBODIMENTS

The method of the present invention is based on the grouping of the information defining the user interface for all different user interface types in a 1) general part which is common for all the different user interface types, the general part—user interface information (GP-UII) and 2) user interface type specific information, the special part—user interface information (SP-UII).

Based on this concept the invention provides a specific implementation of user interfaces. The provided solution addresses three areas a) the structure and content of the control information which describes the user interfaces;

b) the structure and function of the program providing the user interfaces at run-time, and c) the development tools to be used for developing the control information for the different user interface types.

The information describing the user interface, henceforth called UII (user interface information), is structured according to an AND/OR graph with child nodes being dependent on father nodes. This type of graph is called a directed graph. The OR-nodes in the graph represent alternatives, one of which has to be selected by the users, AND-nodes express sets of information units, and terminal nodes attached to AND-nodes represent data input or output to be communicated. Each node of the UII has associated with it the GP-UII and multiple SP-UIIs as described above.

Figure 1:
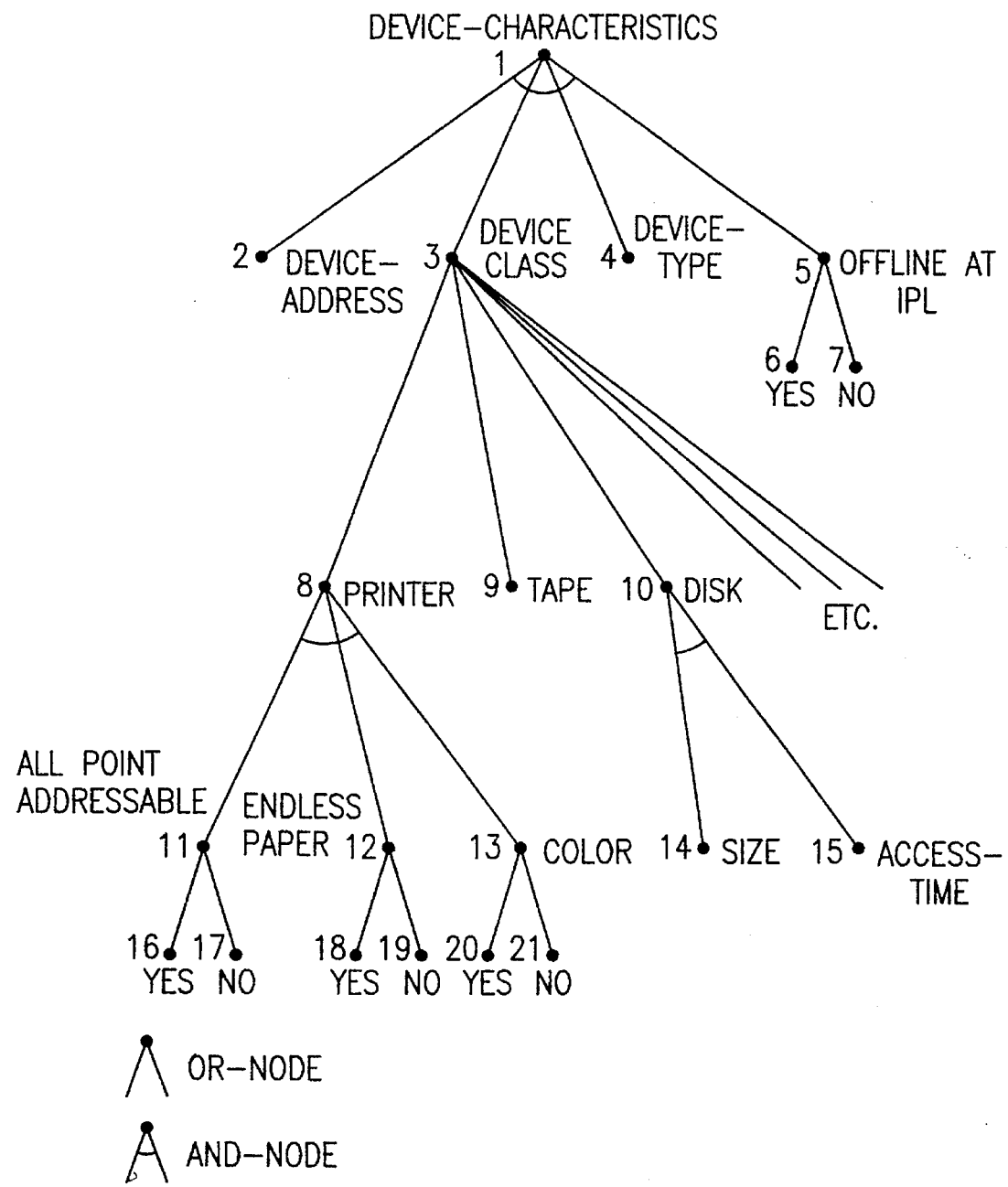
FIG. 1 shows an example of an AND/OR graph for a user interface for specific device characteristics in accordance with the present invention.

In FIG. 1 an UII example is given in a graphical representation. In this example node 1 is an AND-node (the father node) and branches to nodes (the child nodes) 2 to 5 representing device address, device class, device type and off-line at initial program loading (IPL). Node 5 has two terminal nodes, nodes 6 and 7, representing YES or NO which are selected by the user, thus indicating whether the device is off-line at IPL. In further defining the device class the OR-node 3 branches to AND-node 8 for a printer, 9 for a tape and 10 for a disk. Other possible branches are indicated as etc. The printer has attributes specifying an all-point-addressable option indicated with node 11, an endless paper option as indicated by node 12 and a colour option indicated by node 13. If any of these three cases are selected, this fact is then indicated by a YES or NO selection on the terminal nodes 17 to 21. The AND-node 10 leads in the given example to node 14 indicating the size and to node 15 indicating the access time of the disk.

In a real programming system the graphical representation (of course) has to be mapped to data structures, for example to a list of 'Nodes'. A 'Node' then consists of A node-name The node name should be unique in the graph, or capable of being made unique by adding a qualifier to it.

Structural information

Node-type (AND,OR,TERMINAL)

Child-nodes (deeper level)

Next-node (same level)

General information common for all user interface types. This information together with the structural information constitutes the GP-UII mentioned above.

Special information for each user interface type being supported. This is the SP-UII mentioned above.

Details on this structure for the example depicted in FIG. 1 are given in Table 1:

TABLE 1

```
/* NODE 1 */
Node-number: 1
Node-name: Device-characteristics
GP-UII:
    Node-type = AND-Node
    Child-nodes = 2, 3, 4, 5
    Next-node = none
SP-UII for panel oriented dialogs:
    New-Window = Yes
    Panel-name = PDVCHAR
/* NODE 2 */
Node-number: 2
Node-name: Device address
GP-UII:
    Node-type = TERMINAL
    Child-nodes = none
    Next-node = 3
    Variable-name = VDVADDR
    Data-type = HEX
    Data-length = 4
```

TABLE 1-continued

```
    Help-text = HDVADDR
    Checking-Routine = CHDVADDR
SP-UII for panel oriented dialogs:
    Panel-name = PDVCHAR
    Field-name = FDVADDR
SP-UII for Command Interface:
    Keyword = DEVICE-ADDR
SP-UII for Speech Output:
    Text = 'Enter Device Address, maximum 4 hex digits
/* NODE 3 */
Node-number: 3
Node-name: Device-class
GP-UII:
    Node-type = OR-node
    Child-nodes = 8, 9, 10, . . .
    Next-node = 4
    Variable-name = VDVCLS
    Help-text = HDVCLS
    Checking-Routine = CHDVCLS
SP-UII for panel oriented dialogs:
    Panel-name = PDVCHAR
    Text = 'Select one of the following'
SP-UII for command interface:
    Keyword = DEVICE-CLASS
SP-UII for Speech Output:
    Text = 'Enter Device Class'
/* NODE 4 */
Node-number: 4
Node-name: Device-type
GP-UII:
    Node-type = TERMINAL
    Child-nodes = none
    Next-node = 5
    Variable-name = VDVTYP
    Data-type = CHAR
    Data-length = 7
    Help-text = HDVTYP
    Checking-Routine = CHDVTYP
SP-UII for panel oriented dialogs:
    Panel-name = PDVCHAR
    Field-name = FDVCHAR
SP-UII for command interface:
    Keyword = DEVICE-TYPE
SP-UII for Speech Output:
    Text = 'Enter Device Type'
```

Figure 2:
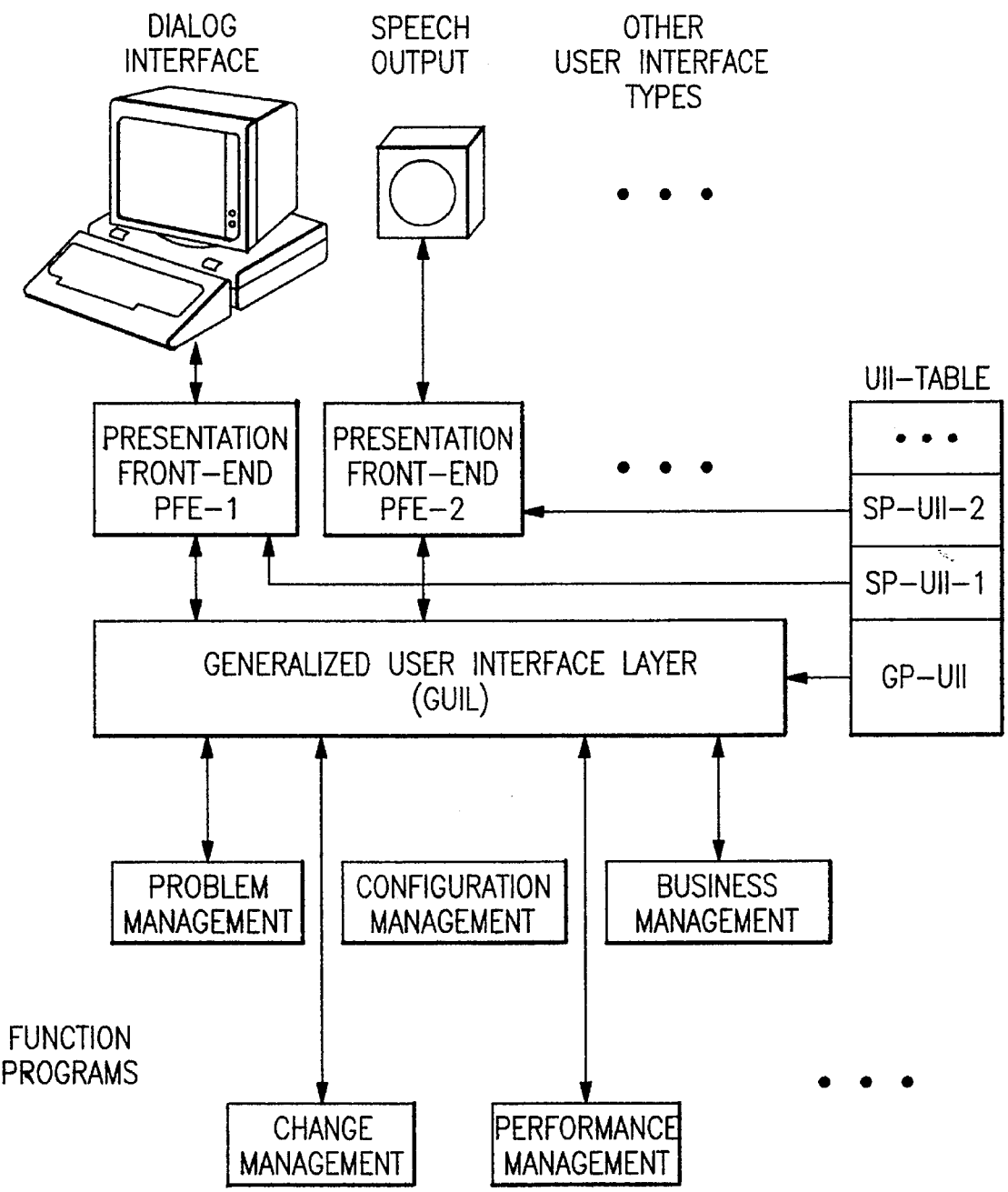
FIG. 2 the overall structure of the user interface in accordance with the present invention.

The structure and function of the programs providing the user interfaces at run-time includes a program structure for support of multiple user interface types having a so-called generalized user interface layer (GUIL). As depicted in FIG. 2 this layer resides between the function programs and the presentation front end programs PFE-1, PFE-2, . . . , PFE-n. The function programs implement the function of the programming system in a user interface type independent way. That means with other words that the function programs exchange data with their PFEs through the GUIL in a user interface type independent way. The GUIL is a program which knows which specific user interface type is presently active and invokes the corresponding PFE. In addition, the GUIL keeps track of user interface parameters already obtained, and skips the invocation of the PFE if the desired parameters are already available. In FIG. 2 examples of function programs such as problem management, change management, configuration management, performance mangement, and business management are shown. The following shows a sample control flow between function program, generalized user interface layer, and presentation front end. In this example, there are two alternative interface types: a dialog interface and a command interface. The function program in this sample is a configuration management function to add a device.

Function Program

Fill a value buffer with output (initial/default) values

Call GUIL, parameters (value buffer, UII-table name)

Get input values from value buffer and perform 'Add Device' function

Generalized User Interface Layer (GUIL)

Determine currently active PFE

Call PFE, parameters (value buffer, UII-table name)

Return to function program

Presentation Front End (PFE) for

| Dialog Interface | Command Interface |
| --- | --- |
| Determine following information from UII-table<br>o name of panel<br>o names of fields within panel<br>o Data length of fields<br>o . . . | Determine the command keywords from UII-table<br><br>Locate each keyword in command input string<br><br>Get the values associated to each keyword from command string |
| Fill out fields with values from value buffer<br><br>Call dialog interface manager<br><br>Use checking-routines (UII-table) to validate input values<br><br>Put input values into value buffer<br>Return to GUIL | Use checking-routines (UII-table) to validate input values<br><br>Put input values into value buffer<br><br>Return to GUIL |

Besides enabling the concurrent support of different user interface types with a given installation, it gives the further advantage to be prepared for future addition of new interface types.

Some typical user interface types which may be supported this way are the following Menu oriented display terminal interface, i.e. a dialog interface.

This type of interface is probably the most used user interface type today. Advanced versions of this interface type utilize APA displays and a mouse device with techniques such as pop-up windows, action bars, radio buttons, check buttons, etc. Later under the heading "The development process for a user interface" it is described how the UII can be mapped to typical panel types of such a type of user interface.

Direct Manipulation interface

With this type of user interface the objects related to a certain function are shown at the screen of a display terminal and the user causes actions on these objects by manipulating the objects directly on the display screen. Among all the interface types considered, the direct manipulation interface requires the highest degree of abstraction when being translated into the UII. Nevertheless, it is useful to map the direct manipulation interface to an interface layer reflecting the UII (i.e. to the Generalized User Interface Layer shown in FIG. 2), not only if further interface types are being supported.

Command Interface

As a complement to menu oriented interfaces, the command interface is useful for fast access to functions by experienced users. With the UII concept there is no problem with mapping a command language interface to an interface reflecting the UII.

Speech Input and/or Speech Output

The constructs supported by the UII can easily be mapped to speech output statements. Special conventions would have to be introduced for the handling of lists. The problem of supporting speech input for more than a limited fixed vocabulary would have to be solved, but is independent of using the UII concept, and not part of the present invention.

Program Call Interface

Beside supporting an external user interface, it is often desirable to support access to the same functions through an internal interface which can be accessed from arbitrary programs. Obviously the Generalized User Interface Layer shown in FIG. 2 is ideally suited for support of such a program call interface. Conventions with respect to the syntax of the program call request, the type and format of the return information, checking rules, etc. have to be defined.

As shown in FIG. 2 the 'Generalized User Interface Layer' GUIL is controlled by the UII-table. The UII-table reflects the internal (i.e. program readable) format of the UII. This means, it defines the essential information communicated between the computer and the human the GP-UII and information on the dialog structure. Access to interface type specific information, the SP-UII, is normally supported by including references to interface type specific control information in the UII-table. It may, however also be useful to include the respective control information for the primary user interface types being supported already in the UII-table as depicted in FIG. 2.

In the UII-table layout shown in Table 2 the information required for the menu oriented display terminal interface and the command interface is included. Direct manipulation interface and speech I/O are not considered in the shown case.

Table 2 shows the machine readable format of a node as described in Table 1.

TABLE 2

```
Declare
1 UII-Node (n),
    2 Node-number,
    2 Node-name,
    2 General-UII,
        3 Node-type       /* see explanation below    */
        3 Child-nodes,    /* children of this node    */
        3 Next-node,      /* sister of this node      */
        3 Variable-       /* name of associated variable */
          name,
        3 Data-type,      /* type of variable value   */
        3 Data-length,    /* max.length of variable value */
        3 Checking-       /* variable value validation */
          routine,
        3 Help-text,      /* name of associated help  */
    2 Dialog-UII,
        3 Panel-name,     / *name of panel            */
        3 Field-name,     / *name of field on panel   */
        3 Text,           / *prompt text              */
        3 New-window,     / *start new panel indicator */
    2 Command-UII,
        3 Keyword,        / *command keyword          */
```

The Node-type may be 'AND-node', 'OR-node', 'IN-field', OUT-field', or "ALTERNATIVE' (of an OR-node). It may also be useful to support special node types for 'LIST's. The structure of the UII is expressed by storing the successor nodes of an AND-node, OR-node, LIST following these nodes. Such a list of successor nodes is terminated by an entry with Node-type=END.

Table 3 shows the UII-table related to the later explained Example 3 and the panel in FIG. 6.

TABLE 3

```
/* AND-Node for 'Print Options'                        */
Node-number       = 1
Node-type         = 'AND-node'
Data-length       = 0
Variable-name     = ' '
Variable-type     = 'CHAR'
Checking-routine  = 'CHECK-PO'
Help-text         = 'HELP-PO'
Keyword           = 'PRINT-OPTIONS'
Panel-table       = 'PANTAB-1'
Successor-node    = ' '
/* Node for 'File name'                                */
Node-number       = 2
Node-type         = 'IN'
Data-length       = 8
Variable-name     = 'VAR001'
Variable-type     = 'CHARACTER'
Checking-routine  = 'CHECK-FN'
Help-text         = 'HELP-FN'
Keyword           = 'FILE-NAME'
Panel-table       = 'PANTAB-1'
Successor-node    = ' '
/* Node for 'Font Type'                                */
Node-number       = 3
Node-type         = 'OR'
Data-length       = 0
Variable-name     = 'VAR002'
Variable-type     = 'INTEGER'
Checking-routine  = 'CHECK-FT'
Help-text         = 'HELP-FT'
Keyword           = 'FONT-TYPE'
Panel-table       = 'PANTAB-1'
Successor-node    = 7
/* Details for the following nodes
   are not shown here                                  */
/* Node for 'Printer Address'                          */
/* Node for 'Number of copies'                         */
/* Node for 'End of AND node for Print Options         */
/* OR-Node for 'Font Type'                             */
/* Node for 'Prestige Elite'                           */
/* Node for 'Courier'                                  */
/* Node for 'Essay Standard'                           */
/* Node for 'Italics'                                  */
/* Node for 'End of OR-node for Font Type'             */
```

The above described structure is suitable for supporting the interface to a dialog manager (for a menu oriented display terminal interface) as well as for the implementation of the parsing for a command and/or program call interface.

As furthermore can be seen from FIG. 2 the generalized user interface layer is controlled by the information GP-UII from the UII-table. The different presentation front end programs PFE-1, PFE-2, etc. are controlled by the associated special part information SP-UII-1 and SP-UII-2 respectively. The presentation front end programs support the various user interface types.

The GUIL (program) uses the GP-UII from the UII (table) to provide the following functions:

a) a common interface for function programs to exchange data with the end user; this common interface makes the function programs independent from the actual user interface type, b) facilities which are useful for all types of user interfaces; one example of such a facility is a command recording facility which records all specifications made by the user in a general way namely in the form which is accepted by the command interface and thus enables a "Replay" of user interface sessions, c) an integration of the various interface types so that for example dynamic switching among them is possible.

Figure 3:
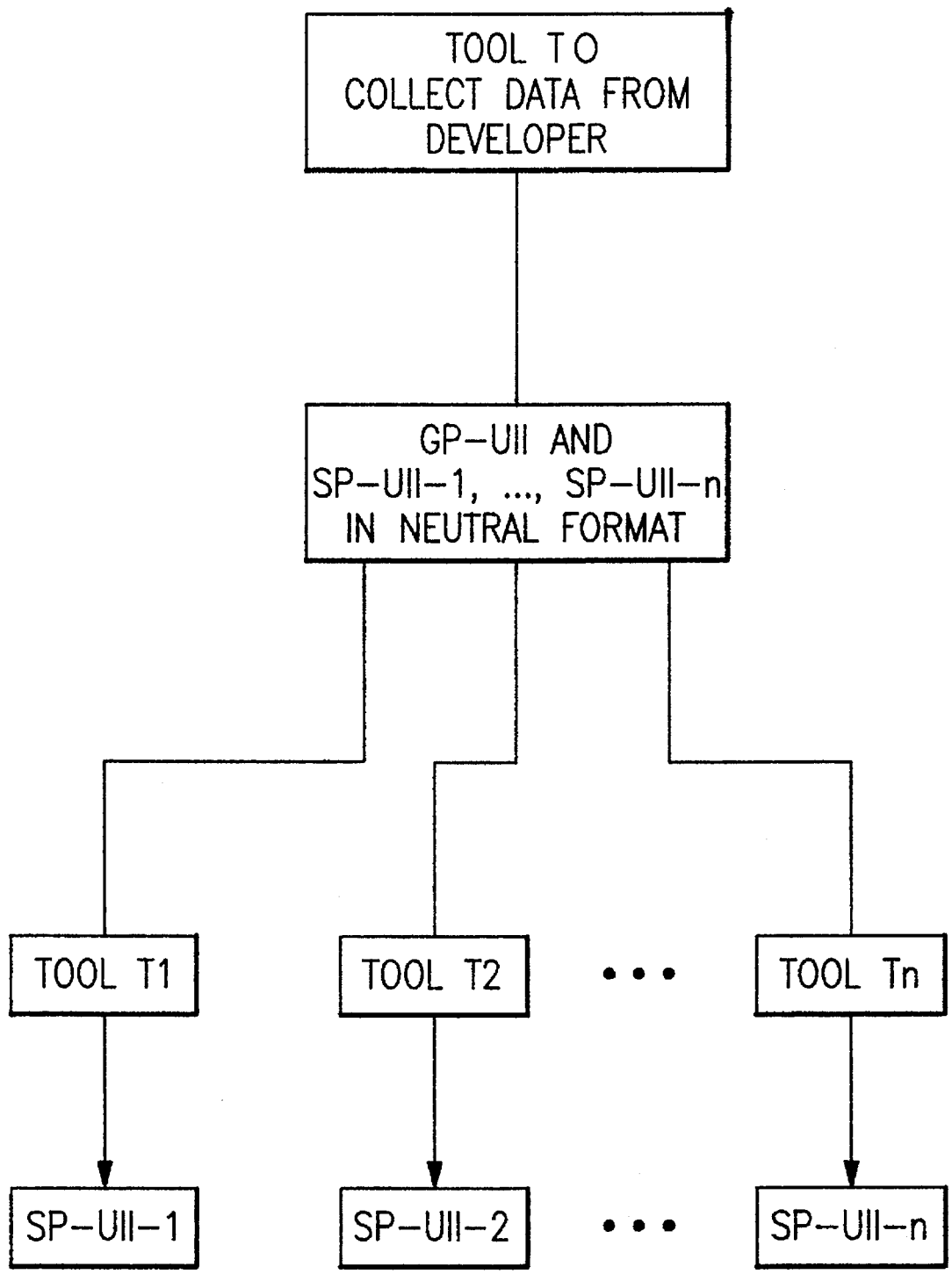
FIG. 3 block diagram showing development tools in accordance with the present invention.

In connection with FIG. 3 development tools used in the development process are shown. With a tool T0 data from a developer are collected so that a neutral form is established. Thus in neutral form the general part—user interface information, GP-UII and the special part—user interface information, SP-UII for the different user interface types is generated in neutral form. From there different tools T1 to Tn are used to generate the special part user interface information in specific form.

The user interface type specific part of the user interface control information (SP-UII), may be requested in a certain format. For example, the panel oriented dialog interface usually requires panel definitions in a format specified by some dialog manager component. Similarly, a speech input and output facility may request the definition of vocabularies in form of specific data sets. In order to ensure that these user interface type specific definitions are consistent, the concept providing an-integration of multiple user interface types also includes an integrated solution for the development tools used to generate the various user interface type specific definitions.

The solution provided by the present invention is shown in FIG. 3. As shown in FIG. 3, the development process starts by defining the general part of the control information which is common to all the different user interface types. From there, the development continues by generating the user interface type specific definitions. The collection of this kind of information and the transformation into the format requested by the existing programs is supported by specific tools T1, ..., Tn.

Possible Notation for Specifying User Interface Information

In the preceding description, the UII has been described in some informal notation. Since the UII has to be specified by the developers of the various function programs, a well-defined language for specifying an UII is required. Below a possible notation for such a UII language is shown without the user interface type specific parts.

For the specification of an UII essentially two constructs are needed: a way to specify sets or lists of entities, and a way to specify alternatives. As a graphical representation, therefore, AND/OR graphs are an elegant way to express an UII. For the applications considered by the invention the UII notation described below has been used:

If an item 'element-x' can be defined as a set of alternatives alternative-1, alternative-2, ..., alternative-n, this is expressed by

```
<select> element-x
<alt> alternative-1
<alt> alternative-2
...
<alt> alternative-n
<eselect>
```

If an item 'element-x' can be defined as consisting of a set of sub-items subitem-1, subitem-2, ..., subitem-n, this is expressed by

```
<set> element-x
<in> subitem-1
<in> subitem-2
...
<in> subitem-n
<eset>
```

The <in> units indicate input items. Alternatively, <out> may be used to indicate output data.

In addition, the following conventions are used:

Non-terminal symbols, i. e. symbols for which there exist other UII definitions, start either with the '%' character or use a <link> tag.
Example:
```
<select> option-x
<alt> %further_details
<alt> no
<eselect>
```
or
```
<select> option-x
<link> further_details
<alt> no
<eselect>
```

The "further details" may be <link>ed in multiple <set> or <select> units.

If, for a certain point in the UII, a list of items 'element-y' is required, this is described by adding the suffix '-list' to the item 'element-y'
Example:

```
<set> element-x
<in> %element-y-list
<in> element-Z
<eset>
```

It is then sufficient to have a further definition for 'element-y' (not 'element-y-list').

The item 'element-x' will then contain all of the sub-items in 'element-y' and the sub-item 'element-z'.

The 'element-y' will be described:

```
<set> element-y-list
<in> subitem-1
<in> subitem-2
...
<in> subitem-n
<eset>
```

The use of the '-list' suffix is particularly useful when all of the sub-items must be handled together, e.g. when they must be all input at the same time, and nothing else may interrupt the input process.

If an item 'element-x' has only the two alternatives 'YES' and 'NO', this can be expressed by adding the suffix '-OPT' to 'element-x'.
Example:

```
<in> element-x-OPT
is equivalent to
<in> %element-x
<select> element-x
<alt> YES
<alt> NO
<end>
```

Comments may be placed by starting with '/*' and terminating with '*/',
Example:

```
/*      This is a comment       */
```

Relation to Panel Types

The introduction of the UII concept in accordance with the invention allows independence from different types of communication devices, e.g. display, typewriter, speech I/O and user interface types, e.g. menu oriented, object oriented. The UII notation described above clearly supports this goal.

Looking at a particular device type special rules may be established for mapping the UII to the user interface constructs supported by this device type.

The following describes how the UII can be mapped to the various panel types which can be seen with a dialog oriented display terminal interface. As an example the panel types supported by the IBM CUA standard (IBM System Application Architecture—Common User Access Panel Design and User Interaction, SC26-4351) are considered; these are:

1. Menu Panel

The menu panel shows alternatives to be selected by the user. With character display terminals the alternatives are numbered or associated with mnemonic characters, with APA (all point addressable) display terminals so-called radio buttons may be used.

2. Entry Panel

Entry panels are used to enter values for data variables.

3. Mixed Entry and Menu Panel

Data entry and alternative selections may be mixed within a single panel.

4. List Panel

List panels are a useful interface to operate on lists of data records, for example on a file directory. Usually the lists are scrollable and there is a fixed set of actions shown at the panel which can be applied to the individual list items.

5. Information Panel

The information panel displays information such as help and tutorial text to the user.

In addition, it is described how e.g. special panel elements such as

Action Bars and

Multiple Choice Selection are generated from a given UII.

1. Menu Panel

A <select> unit (if not embedded in any of the cases described below) results in a menu panel.

Example 1:

```
<select> Communication Choices
    <alt> Receive mail
    <alt> Messages pending
    <alt> Mail log
    <alt> Mail status
<end>
```

The resulting menu panel is depicted in FIG. 4.

2. Entry Panel

A plain <set> unit results in an entry panel.

Example 2:

```
<set> Personnel Data
    <in> Name
    <in> Street
    <in> City
    <in> Nationality
    <in> Phone number
    <in> Date of birth
<eset>
```

The resulting menu panel is depicted in FIG. 5.

3. Mixed Entry and Menu Panel

A mixed entry and menu panel can be constructed by including <select> units within a <set> unit.

Example 3:

```
<set> Print Options
    <in> File name
    <in> Font type
        <select>
            <alt> Prestige elite
            <alt> Courier
            <alt> Essay standard
            <alt> Italics
        <end>
    <in> Printer address
    <in> Number of copies
<eset>
```

The resulting menu panel is depicted in FIG. 6.

4. List Panel

The UII for a List Panel can be defined by use of the '-list' suffix described before in "Possible Notation for Specifying User Interface Information".

Example 4:

```
<set> Device Maintenance
    <in> Device-list
        <set>
            <in> Device-def-action
                <select>
                    <alt> Add device
                    <alt> Delete device
                    <alt> Change device
                    <alt> Display device characteristics
                <end>
            <out> Device address
            <out> Device type
            <out> Model number
        <eset>
<eset>
```

The resulting menu panel is depicted in FIG. 7.

If actions can be applied to the list, there are two ways to define them in the UII notation:

1. If the actions can be applied to individual list items, they must be defined within the list unit at the level of the <in> and <out> fields (see Example 4).

2. If the actions apply to the list as a whole or only to a single list item that must be defined outside the list unit.

The actions associated with the list can be specified as an Action Bar by using the conventions described below.

5. Information Panel

The information panel displays information to the user, but does not request any user input e.g. data entry or alternative selections). Since the UII (per definition) does not show explanatory texts, the only information left to be reflected in the UII of information panels is linkage information describing the panel flow. In addition, it may be useful to include, at least a summary of the information panel text in form of comments. Thus, the Example 5 shows the UII of a possible information panel with the successor panels 'Info-Panel-1' and 'Info-Panel-2'.

Example 5:

```
<set> Help on Device Maintenance
/*    Display to the user                    */
/*      - the device maintenance task        */
/*      - the possible functions             */
```

```
<in> %Info-Panel-1
<in> %Info-Panel-2
<eset>
```

6. Specification of Action Bars

An action bar, in the definition of IBM System Application Architecture—Common User Access Panel Design and User Interaction, SC26-4351 is the area at the top of a panel showing a set of action types which can be applied to objects represented in the panel body. If an action type is selected, e.g. by use of a mouse device, a pulldown appears showing the alternative actions for this action type. An action bar can be constructed by use of the suffix '-actions' and by providing the appropriate <select> units. This is shown in Example 6.

Example 6:

```
<set> Device Maintenance
   <in> Device-list
      <set>
         <in> Device-def-actions
            <select>
               <alt> Update
                  <select>
                     <alt> Add device
                     <alt> Delete device
                     <alt> Change device
                  <end>
               <alt> Display
                  <select>
                     <alt> Display device characteristics
                     <alt> Display error recording
                     <alt> Display connections
                  <end>
            <end>
         <out> Device address
         <out> Device type
         <out> Model number
      <eset>
<eset>
```

The panel shown in FIG. 8 shows an Action Bar with a pulldown window for 'Update' in accordance with Example 6.

7. Specification of Multiple Choice Selection

The <select> unit results in a so-called 'Single Choice Selection'. In addition to single choice selections the IBM CUA standard supports menus with 'Multiple Choice Selections' where the user may select multiple items from the given list. In the UII, multiple choice selections can be specified as a group of optional items using the '-OPT' suffix. Such a specification is shown in Example 7 and the resulting panel in FIG. 9.

Example 7:

```
<set> Add I/O device
   <in< Device number
   <in> Device type
   <in> Time-out-OPT
   <in> Error recording-OPT
   <in> Mirroring-OPT
<eset>
```

If the number of choice items is less than a certain number (e. g. 3) the tools used will generate entry fields instead of the check boxes which are used in general for multiple choice selections. In this case the resulting panel will appear as shown in FIG. 10.

The Development Process for a User Interface

There are mainly two uses of the UII specification concept in the context of user interfaces:

1. As a design concept during the development process
2. As an interface which is actually implemented to separate function programs from the user interface program components.

This section addresses the first usage, primarily with respect to the development of a user interface for advanced display terminals.

The design of a user interface starts by defining the UII. This enables the application of several design activities to the relevant design information without looking at final user interface details. The following design activities for a user interface can be applied to the UII:

Overall design of the dialog tree

A typical user interface for display terminals can be expressed by a dialog tree (in many cases it is actually a directed graph). The design of such a dialog tree with arbitrary depth of details can be performed neatly in terms of the UII.

Refinement of the dialog design

The overall design of the dialog tree can be (stepwise) refined based on the UII. The UII is ideally suited for stepwise refinement. For the design of display terminal oriented user interfaces the refinement can even go as far as designing specific panel types as shown in "Relation to Panel Types".

Defining and observing design guidelines

There are many useful design guidelines which can be established for the design of a user interface. Many of them relate to aspects such as dialog structure and can be expressed and verified in terms of the UII.

Design analysis for various purposes

During the design of a user interface there are always situations where the design must be analyzed for various purposes. As an example, it may be required to compare the newly designed user interface with an existing one in terms of equivalence in the information communicated. Here, too, the UII eases the job by concentrating on the essential information.

Design modifications

It is obvious that design modifications are easier as long as unnecessary details are left out in the documentation.

After the (high level) design of the user interface is complete, additional details such as text refinement, panel layout design, exploitation of I/O device characteristics (e.g. color display) have to be defined. For the definition of dialogs for display terminals there usually exist languages and related tools which support the specification of this type of information.

An example of such a language is the IBM SAA Dialog (see IBM System Application Architecture Dialog Tag Language), which supports the definition of display oriented dialogs for SAA supported IBM computers. A so-called Expansion Tool translates and expands a dialog definition given in the UII into the IBM SAA Dialog Tag Language. Beside the UII, the Expansion Tool uses as input:

a Variable Table which describes for each term appearing in the UII the name by which it is referenced in the function program, the length of the variable, and the name of the associated help panel;

an Expand Profile which defines parameters of an expansion run, such as whether a command area is to be generated, the default cursor position, etc.

Table 4 shows the Dialog Tag Language (DTL) which was generated from the UII shown in Example 3 depicted in FIG. 6.

TABLE 4

<PANEL NAME=FIG6 HELP=xxxxx DEPTH=22
WIDTH=76
MSGLINES=1 KEYLIST=KEYLI1 CURSOR=xxxxxx
CSRPOS=1>
Print Options
<TOPINST> Print Options
<DTAFLD NAME=XX0 DATA=%X0 HELP=xxhelp
USAGE=IN
REQUIRED=NO ENTWIDTH=10 AUTOTAB=NO
ALIGN=START
PMTLOC=BEFORE PMT=30 DESWIDTH=20
MSG=xxxx >
File name
<SELFLD NAME=XX1 TYPE=SINGLE
PMTLOC=ABOVE PMT=30>
select Font type
<CHOICE HELP=xxhelp >Prestige elite
<ACTION TYPE=SET VAR=%X1 VALUE=%V1>
<CHOICE HELP=xxhelp >Courier
<ACTION TYPE=SET VAR=%X1 VALUE=%V2>
<CHOICE HELP=xxhelp >Essay standard
<ACTION TYPE=SET VAR=%X1 VALUE=%V3>
<CHOICE HELP=xxhelp >Italics
<ACTION TYPE=SET VAR=%X1 VALUE=%V4>
</SELFLD>
<DTAFLD NAME=XX6 DATA=%X6
HELP=xxhelp USAGE=IN
REQUIRED=NO ENTWIDTH=10
AUTOTAB=NO ALIGN=START
PMTLOC=BEFORE PMT=30 DESWIDTH=20
MSG=xxxx >
Printer address
<DTAFLD NAME=XX7 DATA=%X7
HELP=xxhelp USAGE=IN
REQUIRED=NO ENTWIDTH=10 AUTOTAB=NO
ALIGN=START
PMTLOC=BEFORE PMT=30 DESWIDTH=20 MSG=xxxx '
Number of copies
</PANEL>

Data Communication

The main purpose of a user interface is to communicate between the user on one side and the application program running in the computer on the other side. The data transmitted during the operation of the program—also called the session—from the user to the computer is termed user session data (USD). Since a variety of interface types are supported by the computer, the input USD needs to be stored in a format which is independent of the user interface type being used. This interface-independent type of storage will additionally allow the user during the same session to switch between different user interface types without losing any of the data which has previously been input using another interface type. The user interface-independent format in which the data is stored is termed a USD-list.

The manner in which data is collected for the USD-list will now be described by reference to FIG. 1. The UII graph shown in FIG. 1 is processed from the top downwards. For each node, data is obtained from the user and stored in the USD-list. There is no particular sequence in which the data has to be input since this may depend on the particular interface type chosen. Similarly, the way in which the data is obtained from the user is not relevant since this will also depend on the user interface type chosen. For each node processed, an entry is made in the USD-list consisting of the triple:

{Node-name, value, nesting-level}

The node name refers to the name of the node in the UII-graph, further details for each node are given in Table 1. The value depends on the node type as shown in Table 5:

TABLE 5

| node type | Value |
| --- | --- |
| AND | 0 |
| OR | index of alternative selected |
| TERMINAL-OR | yes/no |
| TERMINAL-AND | value entered by user |

The data in the USD-list can be represented in a tree structure. The value of the nesting-level then gives the nesting level within the tree. For example node 1 in FIG. 1 will have a nesting-level value of 1 since it is the first entry in the tree. Nodes 2 to 5, which are child nodes of node 1, have a nesting-level value of 2.

Before data is obtained from the user, a check needs to be carried out whether the data is already available in the USD-list. This becomes particularly necessary when switching between different user interface types, because the two user interface types may apply different sequences for inputting data when processing the UII graph. A further check that is necessary when switching between interfaces is to ensure that when there is a group of sub-items that have to be treated together (i.e. the items are defined using a '-list' suffix), all of the items are treated before any further operations are carried out.

The storing of user session data into the USD-list has to be done in manner such that the structure of the tree can be determined. This is done by ensuring the triple relating to the top node in the UII-graph is at the top of the USD-list and that the triples relating to the lowest nodes in the UII-graph, i.e. those with the lowest nesting levels, are at the end of the USD-list. When a triple relating to another node has to be inserted into the USD-list, it is inserted into the USD-list after the triple for its father node but before other child nodes of its father node, i.e. other nodes with the same nesting level.

Examples of USD-lists for different User Interface Types

Figure 11:
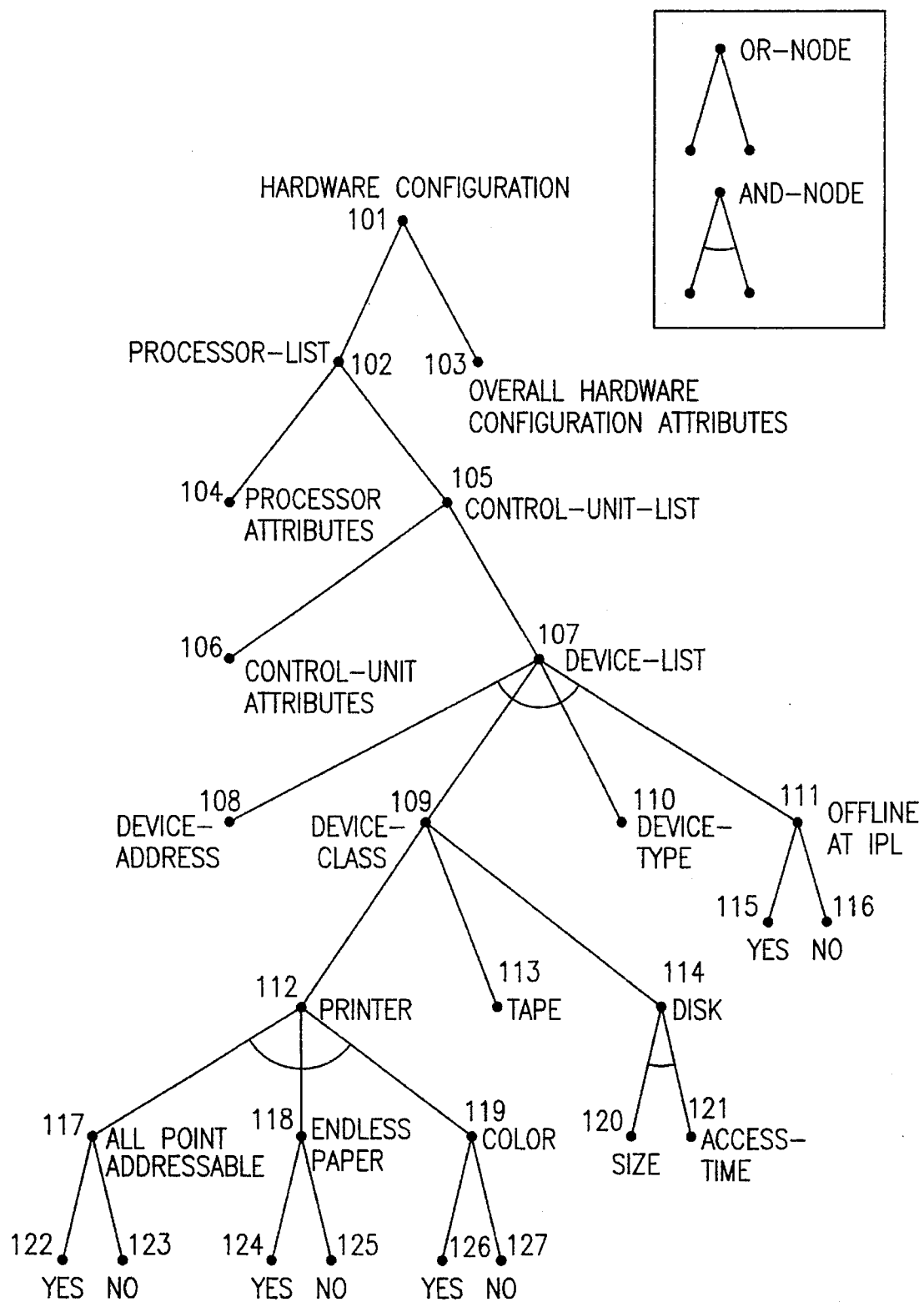
FIG. 11 shows another AND/OR graph for a user interface.

A few examples will illustrate how the USD-list is generated and its relationship to the UII. Suppose the user wishes to define the hardware configuration for a given system consisting of processors, control-units and devices. The UII-graph is shown in FIG. 11. The GP-UII will have the following form:

<set> Hardware Configuration
    <link> Overall hardware configuration attributes
    <set> Processor-list
    <link> Processor attributes
        <set> Control-Unit-list
        <link> Control unit attributes
            <set> Device-list

```
            <element> device address
            <select> device class
                  <set> Printer
                        <select> All Point addressable
                              <alt> Yes
                              <alt> No
                        <eselect>
                        <select> Endless paper
                              <alt> Yes
                              <alt> No
                        <eselect>
                        <select> Colour
                              <alt> Yes
                              <alt> No
                        <eselect>
                  <eset>
                  <alt> Tape
                  <set> Disk
                        <element> Size
                        <element> Access time
                  <eset>
            <eselect>
            <element> device type
            <select> Offline at IPL
                  <alt> Yes
                  <alt> No
            <eselect>
            <eset>
      <eset>
   <eset>
<eset>
```

Example 9—dialog:

Now suppose that the user interface chosen is 'dialog', then dialog specific SP-UII's have to be associated with the UII. Thus the UII will have the following form, the capital letters indicating the SP-UII.

```
<set> Hardware Configuration
DIALOG: WINDOW (title='panel for overall hardware
                       conf.attr.')
   <link> Overall hardware configuration attributes
   <set> Processor-list
   DIALOG: WINDOW (title='Processor Definition')
      <link> processor attributes
         <set> Control-Unit-list
         DIALOG: WINDOW (title='Control Unit Definition')
            <link> Control unit attributes
            <set> Device-list
            DIALOG: WINDOW (title='Device Definition')
               <element> device address
               DIALOG: ENTRYFIELD (text=
               'Device name')
               <select> device class
               DIALOG: RADIOBUTTONGROUP(. . .)
                  <set> Printer
                  DIALOG: CHECKBOXGROUP(text=
                  'If printer specify:'
                     <select> All Point addressable
                           <alt> Yes
                           <alt> No
                     <eselect>
                     <select> Endless paper
                           <alt> Yes
                           <alt> No
                     <eselect>
                     <select> Colour
                           <alt> Yes
                           <alt> No
                     <eselect>
                  <eset>
                  <alt> Tape
                  <set> Disk
                  DIALOG: TEXT(text='If disk specify:')
                     <element> Size
                     DIALOG: ENTRYFIELD (text=
                     'Disk size')
                     <element> Access time
                     DIALOG: ENTRYFIELD (text=
                     'Access time')
                  <eset>
               <eselect>
               <element> device type
               DIALOG:ENTRYFILED (text='device type')
               <select> Offline at IPL
               DIALOG: CHECKBOX (text='Offline at IPL')
                     <alt> Yes
                     <alt> No
               <eselect>
            <eset>
         <eset>
      <eset>
<eset>
```

A panel resulting from UII specification <set> Device-list and all UII entries nested into that <set> is shown in FIG. 12 together with the data input by the user into the system. This produces the following USD-list:

| Device-list | 0 | 3 |
|---|---|---|
| device address | DEVXXX | 4 |
| device class | 3 | 4 |
| Disk | 5 | 5 |
| Size | 70MB | 6 |
| Accesstime | 15000 | 6 |
| device type | IBM3380 | 4 |
| Offline at IPL | 1 | 4 |
| Offline at IPL.YES | 0 | 5 |

The panels are created by a user interface manager, e.g. a dialog manager, which is controlled by the SP-UII. If, at the point of switching to dialog interface type from another interface type, part of the USD-list has already been generated then the data in the USD-list is used to initialise the respective input fields of the dialog panels. Should it be required, then these input fields could be protected from over-typing by the dialog manager.

Example 10—Graphic:

If the user interface is graphic, then graphic SP-UII's need to be associated with the UII. This is shown as follows.

```
<set> Hardware Configuration
GRAPHIC: background = white layout = layout 1
<link> Overall hardware configuration attributes
<set> Processor-list
<link> Processor attributes
GRAPHIC: ICON = procicon
      <set> Control-Unit-list
      GRAPHIC: ICON '2 cuicon
         <link> Control unit attributes
            <set> Device-list
            GRAPHIC:ICON = devicon
            <element> device address
            <select> device class
                  <set> Printer
                        <select> All Point addressable
                              <alt> Yes
                              <alt' No
                        <eselect>
                        <select> Endless paper
                              <alt' Yes
                              <alt> No
                        <eslect>
                        <select>
                              <alt> Yes
                              <alt> No
                        <eselect>
                  <eset>
                  <alt> Tape
```

```
            <set> Disk
                <element> Size
                <element> Access time
            <eset>
        <eselect>
        <element> device type
        <select> Offline at IPL
            <alt> Yes
            <alt> No
        <eselect>
        <eset>
    <eset>
<eset>
<eset>
```

Figure 13:
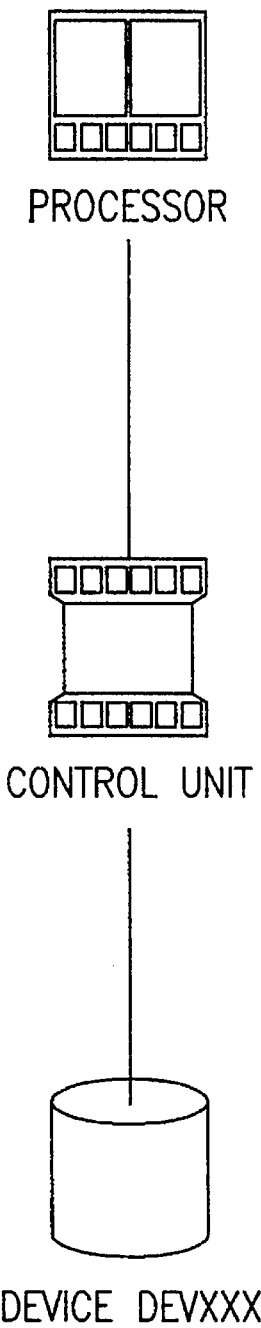
FIG. 13 shows a window produced using the graphic interface.

A window resulting from these specifications is shown in FIG. 13. This window is produced by a graphical user interface manager, which uses the SP-UII. The graphical user interface manager also handles the entries into the USD-list. The USD-list generated using the example of FIG. 13 has the following form:

```
Hardware Configuration                  0       0
Overall hardware configuration attributes
/* details not shown here */
Processor-list                          0       1
Processor attributes
/* details not shown here */
Control-Unit-list                       0       2
Control unit attributes
/* details not shown here */
Device-list                             0       3
device address                          DEVXXX  4
/* device attributes */
```

For simplicity the attributes of the overall hardware configuration, processor, control units or devices are not shown in detail. These would be added into the USD-list by further manipulation of windows, Example 11—Command:

In a command user interface, SP-UII's defining the command syntax have to be added to the UII. This results as follows:

```
<set> Hardware Configuration
COMMAND: SYNTAX (HW_CONF<Processor-list>END)
    <link> Overall hardware configuration attributes
    <set> Processor-list
COMAND: SYNTAX (PROC_DEF<Processor attributes>
<Control-Unit-list)
    <link> Processor attributes
        <set> Control-Unit-list
        COMMAND: SYNTAX (CU_DEF<Device list>)
        <link> Control unit attributes
            <set> Device-list
            COMMAND: SYNTAX (DEV_DEF
            <device address>. . .)
            <element> device address
            COMMAND: SYNTAX (NAME=string)
            <select> device class
            COMMAND: SYNTAX (CLASS=)
                <set> Printer
                COMMAND: SYNTAX (PRINTER)
                    <select> All Point addressable
                    COMMAND: SYNTAX (APA =)
                        <alt> Yes
                        COMMAND: SYNTAX (YES)
                        <alt> No
                        COMMAND: SYNTAX (NO)
                    <eselect>
                    <select> Endless paper
                    COMMAND: SYNTAX ELPAPER=)
                        <alt> Yes
                        COMMAND: SYNTAX(YES)
                        <alt> No
                        COMMAND: SYNTAX(NO)
                    <eselect>
                <select> Colour
                COMMAND: SYNTAX(COLOUR=)
                    <alt> Yes
                    COMMAND: SYNTAX (YES)
                    <alt> No
                    COMMAND: SYNTAX (NO)
                <eselect>
                <eset>
                <alt> Tape
                COMMAND: SYNTAX (TAPE)
                <set> Disk
                COMMAND: SYNTAX (DISK)
                    <element> Size
                    COMMAND: SYNTAX (SIZE=number)
                    <element> Access time
                    COMMAND: SYNTAX (ACCESSTIME=
                    number)
                <eset>
            <eselect>
            <element> device type
            COMMAND: SYNTAX (TYPE=number)
            <select> Offline at IPL
            COMMAND: SYNTAX (OFFLINE=)
                <alt> Yes
                COMMAND: SYNTAX (YES)
                <alt> No
                COMMAND: SYNTAX (NO)
            <eselect>
            <eset>
        <eset>
    <eset>
<eset>
```

So a possible valid command defining a hardware configuration would be as follows.

```
HW_CONF
    PROC_DEF
        CU_DEF
            DEV_DEF
                NAME=DEVXXX
                CLASS=DISK
                    SIZE=70MB
                    ACCESSTIME=1500
                TYPE=IBM3380
                OFFLINE=YES
            DEV_DEF
                NAME=DEVYYY
                CLASS=TAPE
                TYPE=IBM3950
                OFFLINE=NO
END
```

User input from this command procedure would be mapped by a command parser into an USD-list. This would result in the following USD-list:

```
Hardware Configuration                  0       0
Overall_hardware configuration attributes
/* details not shown here */
Processor-list                          0       1
Processor attributes
/* details not shown here */
Control-Unit-list                       0       2
Control unit attributes
/* details not shown here */
Device-list                             0       3
device address                          DEVXXX  4
device class                            3       4
Disk                                    0       5
```

-continued

| | | |
|---|---|---|
| Size | 70MB | 6 |
| Accesstime | 15000 | 6 |
| device type | IBM3380 | 4 |
| Offline at IPL | 1 | 4 |
| Offline at IPL.Yes | 0 | 5 |
| Device | 0 | 3 |
| device address | DEVYYY | 4 |
| device class | 2 | 4 |
| Tape | 0 | 5 |
| device type | IBM 3950 | 4 |
| Offline at IPL | 2 | 4 |
| Offline at IPL.No, | 0 | 5 |

In order to create the USD-list as shown above, it is necessary that the command parser is controlled by the UII. For the switching from an arbitrary user interface type to COMMAND mode a 'Text Generator' (the reverse function to a parser) being controlled by the UII and using as input an USD-list is required.

Example 12—Switching:

Let us now suppose that a user wishes to define the hardware configuration using several user interface types. A sample scenario would be as follows. First the user starts with a command list.

```
HW_CONF
    PROC_DEF
        CU_DEF
            DEV_DEF
                NAME=DEVXXX
                CLASS=DISK
END
```

This would result in the following USD-list:

| | | |
|---|---|---|
| Hardware Configuration | 0 | 0 |
| Overall hardware configuration attributes | | |
| /* details not shown here */ | | |
| Processor-list | 0 | 1 |
| Processor attributes | | |
| /* details not shown here */ | | |
| Control-Unit-list | 0 | 2 |
| Control unit attributes | | |
| /* details not shown here */ | | |
| Device-list | 0 | 3 |
| device address | DEVXXX | 4 |
| device class | 3 | 4 |
| Disk | 0 | 5 |

Figure 14:
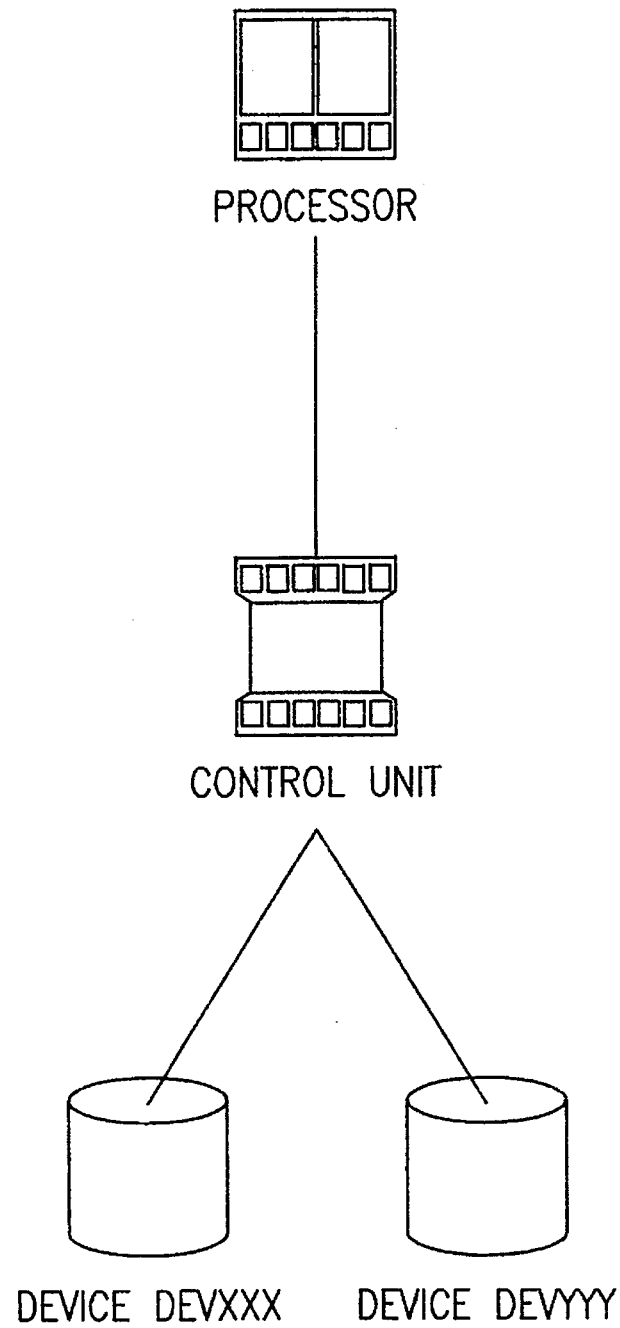
FIG. 14 shows a window produced using the copy command in the graphic interface.

The user then switches to user interface type=GRAPHIC Which would show him or her the window as shown in FIG. 13. In graphic mode the user may add another device by graphically copying DEVXXX to DEVYYY (see FIG. 14). This would extent the USD-list by the following entries:

| | | |
|---|---|---|
| Device-list | 0 | 3 |
| device address | DEVYYY | 4 |
| device class | 3 | 4 |
| Disk | 0 | 5 |

For the new added device the user now wants to complete and update the device attributes by use of the DIALOG type of user interface. This would result in a dialog panel as shown in FIG. 15. The panel shows already the updated device attributes.

After these updates, the USD-list looks as follows:

| | | |
|---|---|---|
| Hardware Configuration | 0 | 0 |
| Overall hardware configuration attributes | | |
| /* detail not shown here */ | | |
| Processor-list | 0 | 1 |
| Processor attributes | | |
| /* details not shown here */ | | |
| Control-Unit-list | 0 | 2 |
| Control unit attributes | | |
| /* details not shown here */ | | |
| Device-list | 0 | 3 |
| device address | DEVXXX | 4 |
| device class | 3 | 4 |
| Disk | 0 | 5 |
| Device | 0 | 3 |
| device address | DEVYYY | 4 |
| device class | 2 | 4 |
| Tape | 0 | 5 |
| device type | IBM3950 | 4 |
| Offline at IPL | 2 | 4 |
| Offline at IPL.No. | 0 | 5 |

Finally, the user may switch back to command mode to get a 'textual view' of what has been defined so far and possibly do further definitions in the command mode. By use of a text editor, for example the user may complete the attributes for DEVXXX:

```
HW_CONF
    PROC_DEF
        CU_DEF
            DEV_DEF
                NAME=DEVXXX
                CLASS=DISK
                    SIZE=70MB
                    ACCESSTIME=1500
                    TYPE=IBM3380
                    OFFLINE=YES
            DEV_DEF
                NAME=DEVYYY
                CLASS=TAPE
                TYPE=IBM3950
                OFFLINE=NO
END
```

Of course, the user is not restricted to this sequence of operations when defining the overall hardware configuration. He or she is free to chose whichever type of interface is appropriate or easiest to work with.

We claim:

1. In a computer, an adaptable user interface system for integrating a number of different user interface types, each of said number of different user interface types being used by a different presentation front-end program, said system comprising:

means for storing in a form of a directed graph user interface information comprising sets of information, each set of information being associated with a node of said directed graph and comprising a first part common to said number of different user interface types and at least two second parts, each second part assigned to a different one of said number of different user interface types;

means for selecting a user interface type by accessing the user interface information of at least one of said nodes, said selecting being under the control of said different presentation front-end programs, each presentation front-end program representing one of said different user interface types and accessing its corresponding second part of said at least one of said nodes.

2. A system according to claim 1, wherein the nodes of said directed graph comprise at least one of AND nodes and OR nodes specifying a connection to at least one node of a next lower level of the directed graph.

3. A system according to claim 1, wherein said system further comprises a presently active user interface type of said number of different user interface types having a corresponding presentation front-end program of said different presentation front-end programs, said system further comprising means for transforming said user interface information of said at least one of said nodes into control information specifying characteristics of the different user interface types, and wherein said transforming means performs a separation of user interface related programs and routing to said presently active user interface type through said corresponding presentation front-end program.

4. A system according to claim 3, comprising at least one function program means that invokes said means for transforming and that implements function semantics of the adaptable user interface system in a user interface type independent way.

5. A system according to claim 3, wherein said means for transforming is controlled by said first part of said user interface information, and wherein said second part of said user interface information controls the corresponding user interface types via their corresponding presentation front end programs.

6. A system according to claim 1, comprising means for storing user session data in a user interface-independent format and in relationship to said directed graph in that data obtained from a user are related to one of said nodes of said directed graph by assigning a node name and a nesting level value.

7. In a computer having an adaptable user interface system, a method for integrating a number of different user interface types, each of said number of different user interface types being used by a different presentation front-end program, said method comprising:

(a) storing in a form of a directed graph user interface information comprising sets of information;

(b) associating each set of information with a node of said directed graph, each set of information comprising a first part common to said number of different user interface types and at least two second parts, each second part assigned to a different one of said number of different user interface types; and (c) selecting a user interface type by accessing the user interface information of at least one of said nodes, said selecting being under the control of said different presentation front-end programs, each presentation front-end program representing one of said different user interface types and accessing its corresponding second part of said at least one of said nodes.

8. A method according to claim 7, wherein the nodes of said directed graph comprise at least one of AND nodes and OR nodes specifying a connection to at least one node of a next lower level of the directed graph.

9. A method according to claim 7, wherein said system further comprises a presently active user interface type of said number of different user interface types having a corresponding presentation front-end program of said different presentation front-end programs; said method further comprising transforming said user interface information of said at least one of said nodes into control information specifying characteristics of the different user interface types, separating user interface related programs and routing to said presently active user interface type via said corresponding presentation front-end program.

10. A method according to claim 7, further comprising implementing function semantics of the adaptable user interface system in a user interface type independent way.

11. A method according to claim 9, wherein said first part of said user interface information controls said transforming of said user interface information into said control information, and wherein said second part of said user interface information controls the corresponding user interface types via their corresponding presentation front end programs.

12. A method according to claim 1, further comprising storing user session data in a user interface-independent format, wherein said user session data is organized in relationship to said directed graph by relating data obtained from a user to one of said nodes of said directed graph by assigning a node name and a nesting level value.

* * * * *

UNITED STATES PATENT AND TRADEMARK OFFICE
CERTIFICATE OF CORRECTION

PATENT NO. : 5,606,702
DATED : February 25, 1997
INVENTOR(S) : Diel et al.

It is certified that error appears in the above-identified patent and that said Letters Patent is hereby corrected as shown below:

In Column 18, lines 10 and 11, " <alt> Yes" and "<alt> NO" should be indented three spaces under "DIALOG:"

In Column 18, line 50 should read "GRAPHIC: ICON = cuicon".

In Column 18, line 59 should read "<alt> No"

In Column 18, line 60 should read "<alt> Yes"

In Column 18, line 63 should read "<select> Colour"

In Column 24, line 25, substitute --9-- for "7".

Signed and Sealed this

Fifth Day of August, 1997

Attest:

Attesting Officer

BRUCE LEHMAN

Commissioner of Patents and Trademarks